United States Patent
Curran et al.

(10) Patent No.: US 6,753,849 B1
(45) Date of Patent: Jun. 22, 2004

(54) UNIVERSAL REMOTE TV MOUSE

(75) Inventors: Kenneth J. Curran, Thousand Oaks, CA (US); David J. Dick, Newbury Park, CA (US)

(73) Assignee: Ken Curran & Associates, Newbury Park, CA (US)

(*) Notice: Subject to any disclaimer, the term of this patent is extended or adjusted under 35 U.S.C. 154(b) by 0 days.

(21) Appl. No.: 09/427,827

(22) Filed: Oct. 27, 1999

(51) Int. Cl.[7] .......................... G09G 5/08; H04N 5/232
(52) U.S. Cl. ............... 345/158; 348/211.99; 348/211.1; 348/211.2
(58) Field of Search .................. 345/158, 169, 345/156; 250/206.2; 455/603; 348/14.05, 211.99, 211.1, 211.2

(56) References Cited

U.S. PATENT DOCUMENTS

| | | | | |
|---|---|---|---|---|
| 3,805,347 A | * | 4/1974 | Collins et al. .................. 445/24 |
| 4,484,295 A | * | 11/1984 | Bedard et al. .................. 708/8 |
| 4,900,914 A | * | 2/1990 | Raff et al. .................... 250/216 |
| 4,914,284 A | * | 4/1990 | Halldorsson et al. .... 250/206.2 |
| 5,023,943 A | * | 6/1991 | Heberle ...................... 455/603 |
| 5,174,649 A | * | 12/1992 | Alston ....................... 362/244 |
| 5,196,689 A | * | 3/1993 | Sugita et al. ............. 250/206.1 |
| 5,253,068 A | * | 10/1993 | Crook et al. ................. 348/734 |
| 5,281,807 A | * | 1/1994 | Poisel et al. ................ 250/216 |
| 5,435,573 A | * | 7/1995 | Oakford ..................... 345/158 |
| 5,567,036 A | * | 10/1996 | Theobald et al. ........... 362/485 |
| 5,724,106 A | * | 3/1998 | Autry et al. ................ 348/734 |
| 5,796,387 A | * | 8/1998 | Curran et al. .............. 345/158 |
| 5,893,633 A | * | 4/1999 | Uchio et al. ................ 362/244 |
| 5,949,403 A | * | 9/1999 | Umeda et al. .............. 345/157 |
| 5,963,145 A | * | 10/1999 | Escobosa .................... 345/169 |
| 6,014,129 A | * | 1/2000 | Umeda et al. .............. 345/158 |
| 6,130,624 A | * | 10/2000 | Guyer .................... 340/825.69 |
| 6,317,118 B1 | * | 11/2001 | Yoneno ...................... 345/158 |

* cited by examiner

Primary Examiner—Amr Ahmed Awad
Assistant Examiner—Alecia D Nelson (57) ABSTRACT

Componentry is added to a conventional universal remote device to enable it to cooperate with a set to beacon to position a cursor or arrow on a television or other display screen and to allow the remote control to perform the functions of a conventional personal computer "mouse" in connection with the cursor, such as, for example, "clicking" on icons on the screen. A wide angle sensor and a stepped beacon pulse are used to increase range of the device, and the beacon pulse sent to the infrared sensor is automatically disabled upon detection of activity on the universal remote section.

23 Claims, 8 Drawing Sheets

UNIVERSAL REMOTE TV MOUSE

BACKGROUND OF THE INVENTION

1. Field of the Invention

The subject invention relates generally to electronic pointing devices and more particularly to a hand-held universal remote controller employing such a device to provide a "mouse" function on a television or other display screen.

2. Description of Related Art

Electronic pointing devices are known in the prior art. One such device is disclosed in U.S. Pat. No. 5,796,387, entitled "Positioning System Using Infrared Radiation." The device disclosed in the '387 patent employs a hand-held positioning controller which responds to light from an infrared beacon to control positioning of objects on a display screen such as a television.

The positioning controller disclosed in the '387 patent includes three sensors. The reference sensor is positioned between the other two sensors and is masked to receive light within a predetermined range of acute angles measured from the axis. One of the other two sensors is a vertical angle sensor that is masked to receive a larger quantity of light from a first side of the horizontal plane than from a second side of the horizontal plane. The third sensor is a horizontal angle sensor that is masked to receive a larger quantity of light from a first side of the vertical plane than from a second side of the vertical plane. The positioning controller further includes circuitry for determining an orientation of the positioning controller using the amounts of light received by the reference sensor, the vertical angle sensor and the horizontal angle sensor.

Presently, set-top box technology is emerging which is delivering added programming and Internet access to the home entertainment center of the consumer. The normal configuration is to have a number of separate boxes, such as a TV, a VCR and a cable or satellite receiver. To this combination can be added a DVD player, integrated stereo sound, etc. Usually these devices are not all of the same brand and each has it's own IR remote control. Most users opt for a single "universal" remote to operate all of the equipment. Many of the OEM remotes have the capability of being programmed to operate the other devices. Consumers generally are not willing to have 4 or 5 remotes.

Additionally, home display screens are increasingly being used as interfaces to computer systems and the Internet. Accordingly, a need has appeared to provide a "mouse" function which can interact with a home display screen in the same manner as a conventional personal computer mouse. Attempts have been made to provide mouse devices operable with home television screens, but their performance has been limited and unsatisfactory.

SUMMARY OF THE INVENTION

A universal remote control device is modified to include circuitry for communicating with a remote beacon to enable the universal remote to provide a mouse-function in conjunction with a display screen. In one embodiment, the universal remote is provided with infrared sensors, which receive infrared energy from the beacon. The amplitude of the beacon pulse transmitted to the sensors is varied and a wide angle sensor is used in order to increase the range of operation. The beacon is automatically turned off to leave the spectrum open for transmitting universal remote control codes and then automatically re-enabled. In a preferred embodiment, this operation is achieved by detecting activity on the remote section and sending a "shut-down" command before outputting TV or other remote control codes.

BRIEF DESCRIPTION OF THE DRAWINGS

The present invention, both as to its organization and manner of operation may be best understood by reference to the following description, taken in connection with the accompanying drawings, of which.

DETAILED DESCRIPTION OF THE PREFERRED EMBODIMENTS

The following description is provided to enable any person skilled in the art to make and use the invention and sets forth the best modes contemplated by the inventor of carrying out his invention.

Figure 1:
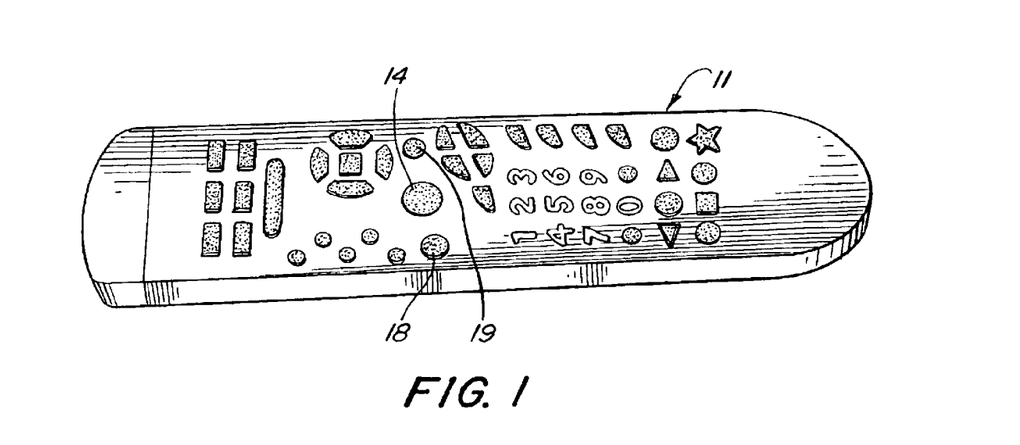
FIG. 1 is a perspective view of a universal remote mouse device according to the preferred embodiment.
Figure 12:
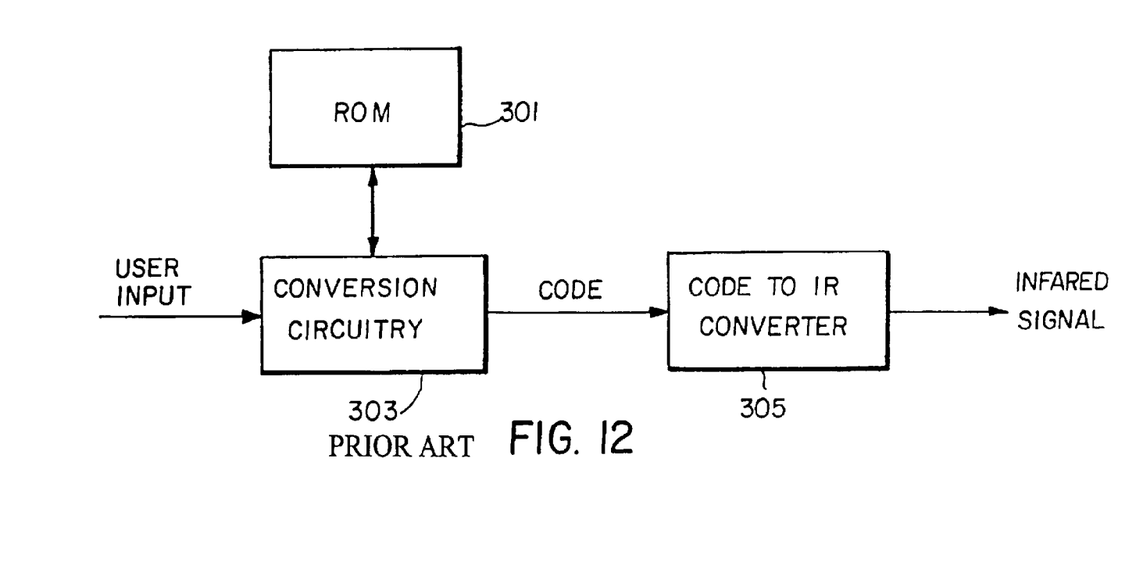
FIG. 12 is a schematic block diagram illustrating conventional universal remote circuitry.

FIG. 1 illustrates an external view of the device 11 of the presently preferred embodiment. As seen in FIG. 1, the device 11 has the appearance of a conventional universal remote control. A working prototype embodiment has been configured utilizing an off-the-shelf universal infrared remote control device, as manufactured by Universal Electronics Inc. 6101 Gateway Drive Cypress, Calif. 90630-4841. This device conventionally may operate a television, VCR, DVD, Receiver/Tuner, CD Player, and satellite/cable TV set top box. As illustrated in FIG. 12, a conventional universal remote typically includes a read-only memory 301 storing a number of device-specific codes, a control circuit 303 to convert a user input into a selected one of the codes, and output circuitry 305 to convert the selected code into an infrared signal for transmission, for example, to a television or set-top box. The device specific codes may, for example, indicate that the volume is to be turned up, the television turned off and/or a number of other well-known functions.

Figure 2:
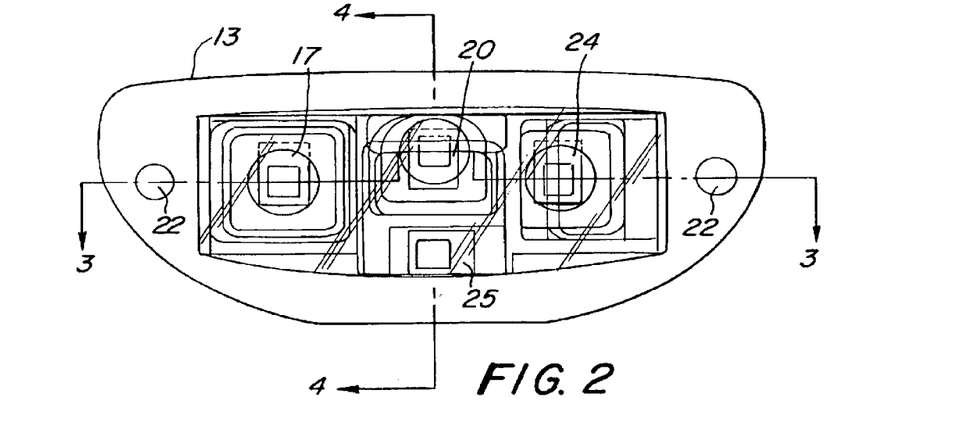
FIG. 2 is a front view of a sensor portion of the device of FIG. 1.
Figure 3:
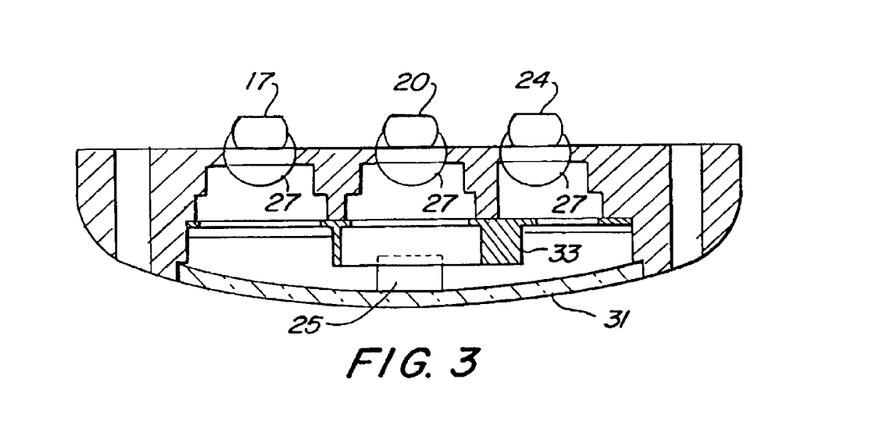
FIGS. 3 and 4 are sectional views at 3—3 and 4—4 of FIG. 2.
Figure 4:
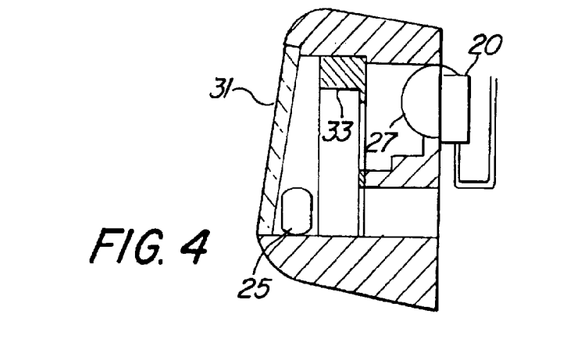

According to the preferred embodiment, componentry is added to a conventional universal remote to enable it to project a cursor or arrow on a television or other display screen and to allow the remote control to perform the functions of a conventional personal computer "mouse" in connection with the cursor, such as, for example, "clicking" on icons on the screen utilizing left clicks and right clicks. In this connection, FIGS. 2–4 illustrate certain modifications made to the universal remote, namely the addition of four infrared light sensors 17, 20, 24, 25 located in a "front end" housing 13. Three of these sensors 17, 20, 24 include a respective lens 27, which serves to increase the effective sensor area. All of the sensors 17, 20, 24, 25 are positioned behind an infrared light transmissive window 31. A masking structure 33 is also included, which masks the horizontal, vertical and reference sensors 24, 20, 17. Further details regarding construction of sensors like sensor 20, 24, 17 are disclosed in U.S. Pat. No. 5,796,387, incorporated by reference herein.

Figure 5:
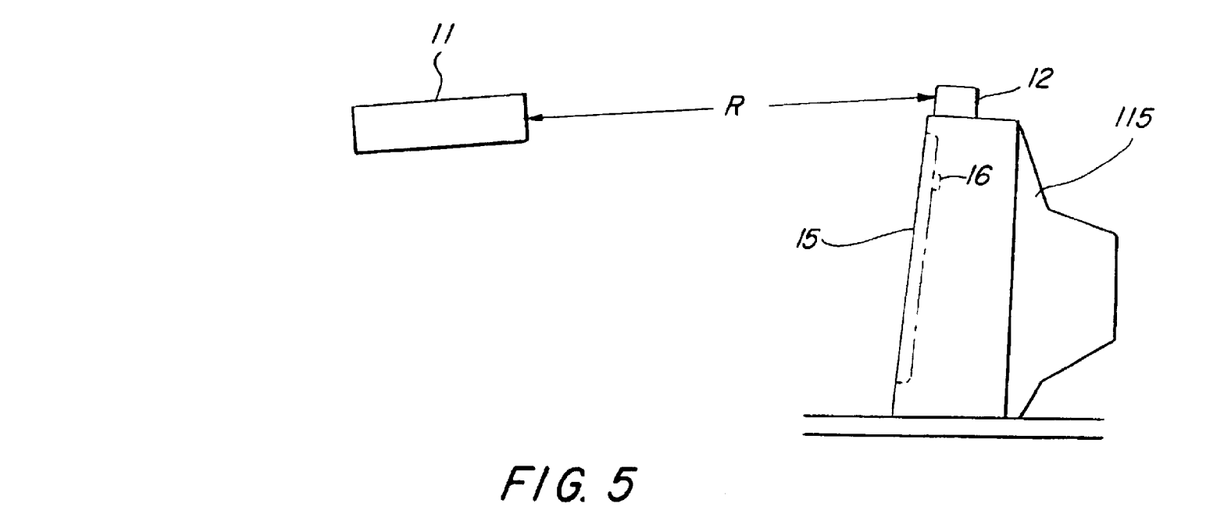
FIG. 5 is a schematic diagram illustrating the preferred embodiment and cooperating apparatus.

In connection with the performance of the mouse function, a beacon 12 is disposed adjacent to the television or other display screen 15, as illustrated in FIG. 5 where the beacon 12 is placed on top of a television 115 and directs light toward the infrared light sensors 17, 20, 24, 25 in the universal remote 11.

In response, the universal remote 11 sends cursor position data back to the beacon 12 or other receiver located adjacent the display screen 15. The infrared LED's 22 which form part of the conventional off-the-shelf universal remote are used for this data transmission function.

The device of the preferred embodiment operates over a range "R" between 2 and 20 feet from the beacon 12, whereas prior art devices constructed according to the disclosure of the '387 patent typically operate over a range of 2 to 8 feet. As a result, the preferred embodiment requires a dynamic range of 100 to 1, as opposed to a dynamic range of 16 to 1. Accordingly, the preferred embodiment of the present invention contains a number of improvements designed to provide a large increase in dynamic range. These include the provision of lenses 27, the wide angle sensor 25 and a beacon pulse 12 of increased energy. Each of these aspects is discussed in further detail below.

In operation, the universal remote 11 can be held by a user and moved to change the position of the displayed cursor 16. When a user changes the pitch of the remote 11, the cursor changes position vertically, and when the user changes the yaw of the remote 11, the cursor changes position horizontally. Thus, the displayed cursor can be moved about on the screen by changing the angular orientation of the remote 11. To perform left click and right click functions, first and second of the buttons on the control are activated. To activate the "mouse mode", one of the "mouse mode" switches (left, 18, Right 19 or Track 14) is activated (FIG. 1).

During operation, the remote 11 is pointed toward the beacon 12 (FIG. 5). In the presently preferred embodiment, the beacon 12 includes light-emitting diodes (LEDs) which emit infrared light directed toward the sensors 17, 20, 24, 25 of the remote 11. A portion of the mask 33 is positioned above the reference sensor 17. The reference mask permits reception of light by the sensor 17 within a predetermined range of acute ranges measured from a line perpendicular to the reference sensor 17. The vertical angle sensor 20 is masked by a vertical angle mask portion of mask 33. The vertical angle mask 22 permits the vertical angle sensor 20 to receive a larger quantity of light from light positioned below the exposed side of the sensor than from light positioned above the covered side of the sensor. The horizontal sensor 24 has a portion thereof masked by mask 33 to limit reception of light on a first side of a second plane bisecting the sensor 24 and to promote reception of light on a second side of the second plane. The wide angle sensor 25 provides an output which is lower than the reference sensor output within a selected range of angles and higher than the reference sensor output outside the selected range.

When a user rotates the remote 11 within a horizontal plane, the horizontal angle sensor 24 receives varying amounts of light from the beacon 12. The amounts received by the horizontal angle sensor 24 vary from the amounts received by the reference sensor 17. For example, a user rotating the positioning remote 11 to the left causes more of the sensor 24 to be exposed to the beacon 12, and a higher and a greater amount of light energy is received into the sensor 24, relative to the reference sensor 17. That is, the relative amounts of light are unchanged with distance from the beacon 12. Similarly, when the user rotates the remote 11 to the right in the horizontal plane, more of the horizontal angle sensor 24 is masked and the amount of light received thereto is decreased relative to the reference sensor 17.

When the remote 11 is rotated up within a vertical plane, more light is received into the sensor 20 relative to the reference to the reference sensor 17, and when the remote 11 is rotated down, the mask 33 comes between the infrared light and part of the vertical angle sensor 20 to reduce-the amount of received light relative to the reference sensor 17. Accordingly, by measuring the relative amounts of light received by the horizontal angle sensor 24 and the vertical angle sensor 20, the pitch and yaw of the remote 11 can be determined.

Figure 6:
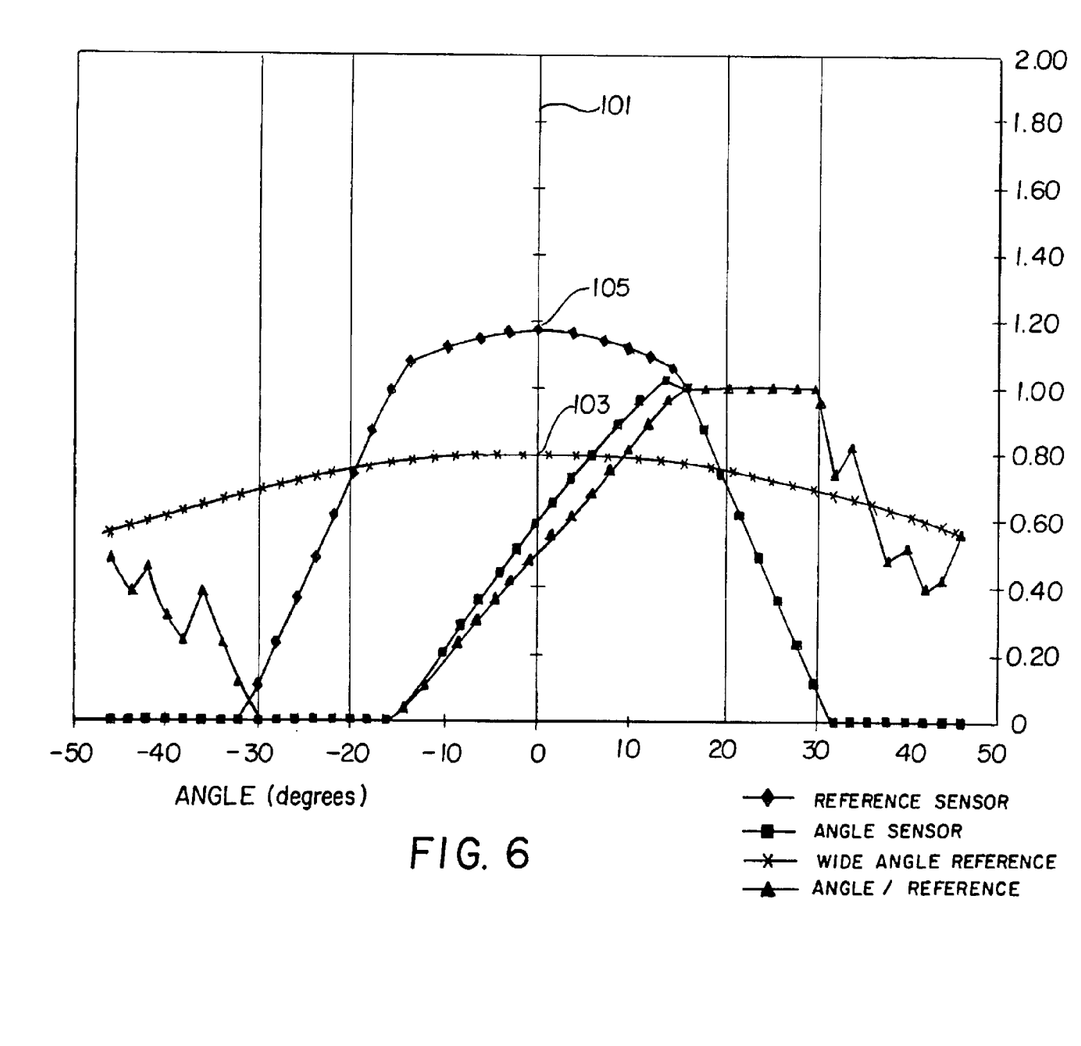

When the remote 11 is rotated beyond the normal minimum or maximum angles in either horizontal or vertical planes, the second reference or wide angle sensor 25 comes into play. As shown in FIG. 6, at the intersection with the "on-axis" line 101, this sensor 25 has a lower output 103 than the main reference sensor level 105. As the angle increases from the on-axis line 101, the main reference signal drops sharply. The wide angle sensor 25 does not cut off at the same angle, and the relative output of the wide angle channel remains high as the angle increases. The circuitry of the preferred embodiment then detects when the wide angle output sensor is greater than or equal to the reference sensor output (e.g., at −20 degrees to +20 degrees) and prevents erroneous output data from being sent back to the beacon 12.

FIG. 6 reflects an angle/reference ratio signal which is satisfactory over the range of +/−30 degrees. At larger angles, where both signals are small, the ratio is no longer well defined. Due to the large dynamic range of the circuitry, it is not possible to exclude the larger angles based on the magnitude of the reference signal. The larger angles are excluded through use of the wide angle sensor 25. This is done by using only the range of angles where the reference signal is greater than the wide angle reference signal. This is the range of +/−20 degrees as shown on the plot of FIG. 6.

The wide angle sensor 25 is particularly effective to eliminate errors at close range. With the 100:1 dynamic range, there is no way for the device to differentiate between signals which are low due to distance and those caused by small internal reflections at close range. This can give signals at close range which appear to be correct to the circuit, but which are not. The wide angle sensor operation eliminates such distractions to the user.

As noted above, lenses 27 have been provided in conjunction with the detectors or sensors 17, 20, 24 to further facilitate the 100:1 dynamic range. In the preferred embodiment, these lenses 27 are designed to be part of a detector diode package and serve to increase the effective detector area. The lenses 27 are designed to have a relatively flat response at the operational angles.

To further assist in increasing range, the infrared energy transmitted by the beacon 12 to the sensors 17, 20, 24, 25 is increased. However, when the energy is increased the time to reach the maximum integral of the reference becomes shorter, and with finite components, the minimum range becomes greater. To compensate for this, the amplitude of the beacon pulse is varied. Each beacon integrate pulse 235 starts out at a level of 1/16 maximum for 24 microseconds, and is then stepped to 1/4 maximum for 13.5 microseconds, 1/2 maximum for 13.5 microseconds, and maximum for an additional 69 microseconds. The reference channel of the pointing device 11 of the preferred embodiment integrates to a maximum level and then disconnects the input amplifiers at that point—excess energy in the remainder of the pulse is ignored.

A number of advantages accrue according to the preferred embodiment. Because the pitch and yaw of the remote 11 is measured relative to the light received from the beacon 12, the cursor 16 can be controlled independent of the television screen color, brightness, and size. Additionally, the range of movement required by remote 11 to cause a similar range of movement by the cursor 16 does not change with distance from the television 10. The presently preferred embodiment utilizes a simple algorithm for generating and transmitting the position data from the positioning controller 14 to the beacon 12. Each transmission of position data is accomplished within the field interval of the television scan. Additionally, ten-bit resolution of the X and Y position data allows for precise positioning and software scaling of sensitivity.

Cursor position jitter is also reduced in the preferred embodiment. The presently preferred embodiment incorporates a progressive weighted averaging algorithm. In the presently preferred embodiment, when the current and previous positions vary by 3 or less, the output is the average of the current position and the previous 3 positions. When the current and previous position vary by 4 or 5 counts, the output is the average of 2 current positions and the previous 2 positions. When the current and previous positions vary by 6 or 7 counts the output is the average of 3 current positions and the previous position. If the current position varies by 8 or more from the previous position, it is outputted without modification. If the full scale is configured to be 20 degrees, as mentioned above, then this angle will generate a binary word of ten ones, equal to 1023 decimal when the positioning controller 14 is positioned at positive 20 degrees (full scale).

The angles corresponding to full scale can be set by the distance from the masks to the sensors and by the sizes of the masks covering the sensors. A first ten-bit word is generated for the vertical angle of the universal remote 11, and a second ten-bit word is generated for the horizontal angle of the remote 11. Further details and guidance regarding determining and loading of the angle data may be gleaned from U.S. Pat. No. 5,796,387, incorporated by reference herein.

Figure 7:
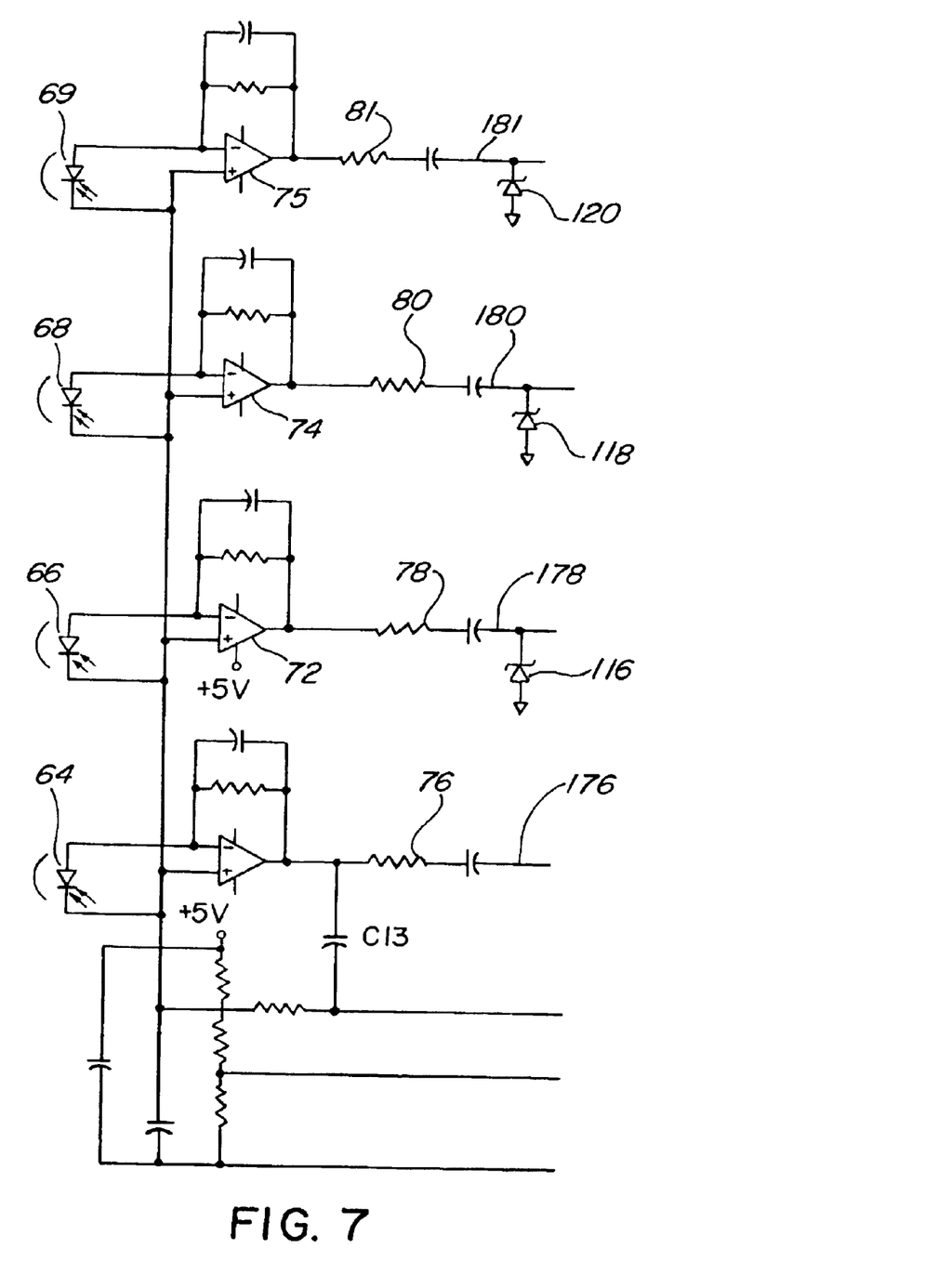
FIGS. 7, 8 and 9 comprise an electrical circuit diagram illustrating the mouse portion of the preferred embodiment.
Figure 8:
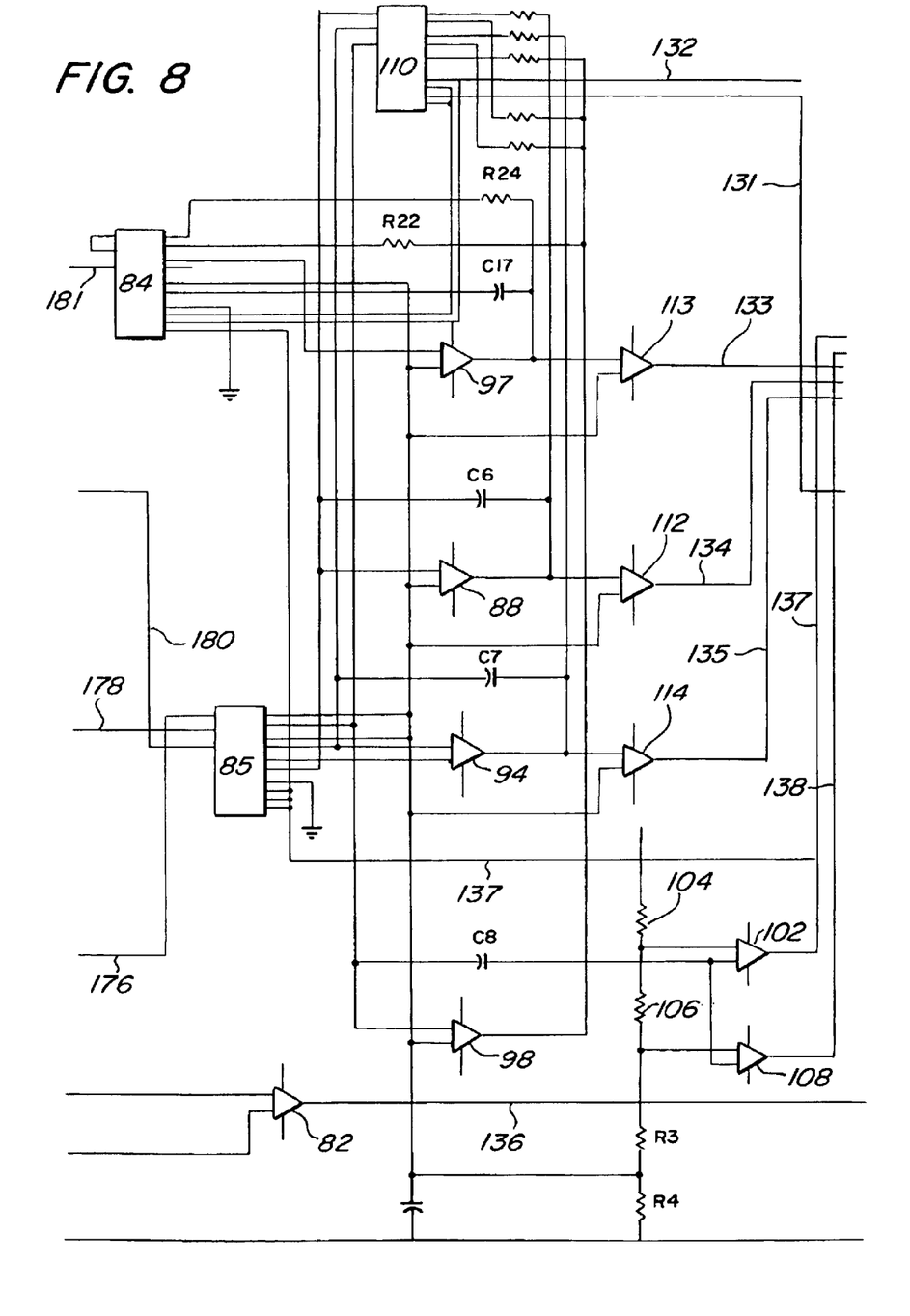
Figure 9:
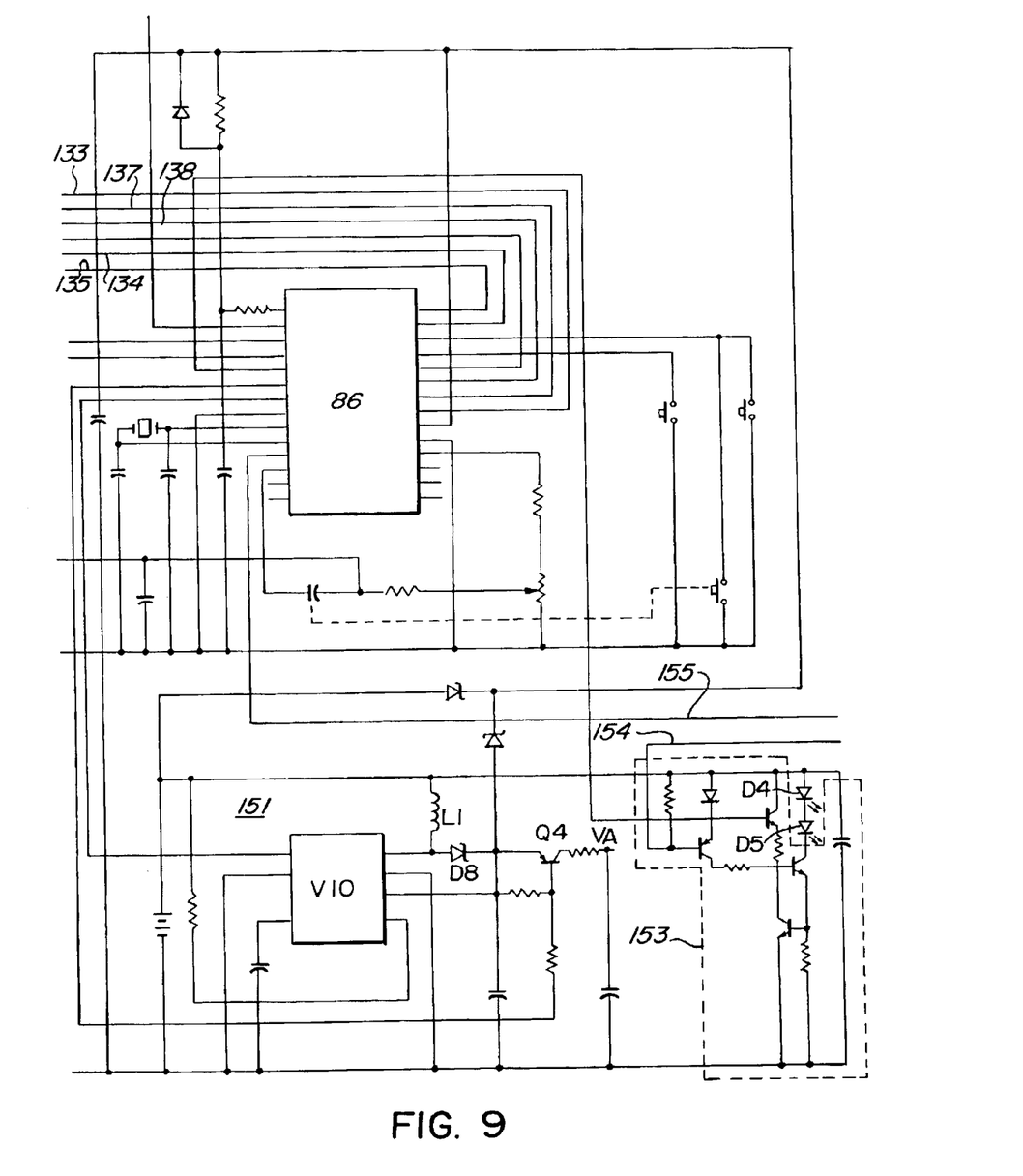

Electronic circuitry for implementing the remote mouse function is illustrated in FIGS. 7–9. With reference to FIG. 7, the reference sensor 17, the vertical angle sensor 20, the horizontal angle sensor 24 and the wide angle sensor 25 comprise four photodiodes 64, 66, 68, 69, respectively. Each of the four diodes 64, 66, 68, 69 are connected to a respective operational amplifier 70, 72, 74, 75, each of which converts the infrared generated current of the respective sensor to a voltage. The four operational amplifiers 70, 72, 74, 75 have the same relative gains.

The four output signals from the respective amplifiers 70, 72, 74, 75 are then passed through respective high-pass filters 76, 78, 80, 81. These filters 76, 78, 80, 81 comprise resistor-capacitor (RC) filters in the presently preferred embodiment. Each of the RC filters 76, 78, 80, 81 have a single pole and a cutoff frequency of about 300 Hz. The filter converts the output voltage of the amplifier back to a current for the integrator stages 97, 88, 94, 98. At frequencies above the cut-off frequency the input stages 70, 72 74, 75 and filters 76 78, 80 and 81 act as current amplifiers for the photodiodes 64, 66, 68, 69 with a current gain of approximately 330. Other filters may be used, such as active filters. The amplifiers may be voltage mode opamps as shown or current mode amplifiers designed with current mirrors or operational transconductance amplifiers.

The output of the amplifier 70 is tapped via a capacitor C13 to a comparator stage 82 (FIG. 8), which is used to sense a trigger signal and pulse a microprocessor 86 over signal line 136 to begin operation. An over-range condition occurs when the sensors 17, 20 and 24 are less than the minimum distance from the beacon 12 in the presently preferred embodiment. This over-range condition occurs when the reference operational amplifier 70 is saturated, in which case the integral is no longer valid. This condition is indirectly determined by the time required for the integrator 98 to reach its maximum value determined by comparator 102.

With reference to FIG. 8, the RC filter outputs 176, 178, 180 of three of the filters 76, 78, 80 are fed to x, y and z inputs of a first field effect transistor (FET) switch 84, which is controlled by the microprocessor 86. The RC filter output 181 of the filter 81 is fed to the z input of a second FET switch 85. The FET switches 84 and 85 are basically triple-pole, double-throw switches having three states. The switches 84, 85 each have control inputs A, B, C and Inhibit. The A, B and C inputs switch the x, y, and z inputs between output pins $x_0$, $x_1$; $y_0$, $y_1$ and $z_0$, $z_1$, respectively.

The FET switch 84 is connected to a horizontal angle integrator comprising an operational amplifier 88 and a capacitor C6, a vertical angle integrator comprising an operational amplifier 94 and a capacitor C7, and a reference angle integrator comprising an operational amplifier 98 and a capacitor C8. The FET switch 85 has its $z_0$ output connected to a fourth integrator comprising an operational amplifier 97 and a capacitor C17.

The switches 84, 85 are used to simultaneously reset the four integrators, then start simultaneous upward integration by the four integrators, and then switch the integration by the vertical, horizontal and wide angle integrators to the down-ramp mode, as described further below.

During the quiescent state before a trigger pulse, the FET switches 84 and 85 have respective resistors R16, R17, R18, R24 connected across the integrating capacitors C6, C7, C8, C17. In this state the four integrators are reset. A signal from the microprocessor 86 on signal line 137 to the A, B and C inputs of switch 84 and the C input of switch 85 connects the outputs of the filters 81, 80, 78 and 76 to the respective integrator.

The input signal to the reference operational amplifier 98 is integrated until either the reference output exceeds the threshold of a threshold comparator 102 or 120 microseconds have passed, whichever occurs first. Looking at this reference channel, when the output of the reference integrator 98 equals the threshold set by respective resistors 104, 106, R3 and R4, a signal is placed on signal line 137 by the comparator 102 directing the FET switches 84 and 85 to turn off all of the integrators. Alternatively, if the microprocessor 86 detects that 120 microseconds have passed since it directed integration to begin, then the FET switches 84, 85 will similarly be turned off over signal line 137 by the microprocessor 86.

As the desired result of circuit operation is the ratio of the reference channel to each of the horizontal and vertical angle channels, the voltage accumulated by the reference integrator 98 is next connected to the horizontal and vertical integrators 88, 94 through the downramp switch 110. The time required to return the integrator outputs to zero (as sensed by comparators 112 and 114) is equal to the ratio of the unknown angle inputs and the reference. When both outputs of the integrators 88, 94 have reached zero, the position data (binary form of 0 to 1023) is stored, and the integrators 88, 94, 97, 98 are reset by the microprocessor 86 via line 131.

At the same time that the reference integrator 98 is connected to the inverting inputs of integrator amplifiers 88, 94, it is also connected via resistor R22 and switch 85 to the inverting input of the wide angle integrator 97. The resultant downramping is monitored by comparator 113 whose output is sent to the microprocessor 86 over signal line 133. If this output 13 signals that zero has been reached or after a selected point in time, the microprocessor knows that the values determined for the horizontal and vertical channels are meaningless and unreliable. Hence, they are not used.

Thus, the downramp switch 110 facilitates an analog-to-digital conversion using a dual slope integration technique. According to this technique, an unknown is integrated for a fixed period of time, and then a known is used to determine the time required to deintegrate it (integrate it in the opposite direction back to zero). Thus, the first slope of the dual slope integration involves integrating the unknown where integration occurs to a preset value. For example, a reference signal between the maximum and the minimum thresholds will be integrated for 100 microseconds (a fixed period). Since the desired result is the ratio of the two voltages (the reference to the vertical, for example) instead of the absolute value of the two voltages, the reference voltage is used as the downramp reference. This essentially divides the one voltage by the other. Basically, the conversion is the amount of time, counted by the microprocessor 86, required to integrate back to zero from the unknown condition. Full scale occurs when the unknown is equal to the reference.

As noted, integration occurs until a threshold level is met or until a predetermined time has expired. The 100-to-1 dynamic range of the presently preferred embodiment is obtained by integrating until a certain voltage is met. This may take 10 microseconds, which yields a 25-to-1 dynamic range (with the stepped input from the beacon 12). At the end of the 100 microseconds (assuming the maximum threshold was not met) a second determination is made as to whether a minimum threshold has been met. So, if the output of the operational amplifier 88 has not met the minimum threshold so detected by comparator 108, an under-range condition is flagged and the data is not used. An under-range condition may occur, for example, when the remote controller 14 is more than twenty feet away from the beacon 12. If the output exceeds the minimum threshold but does not meet the maximum threshold, the data is used.

When the integrator switches in the FET are turned off, three Schotky diodes 116, 118 and 120 serve as clamping diodes for the respective filter capacitors. These clamping diodes prevent the switches from being reverse biased The microprocessor 86 is used to control timing for the analog-to-digital conversion and format the data for transmission over an infrared back channel to the beacon 12. Data is transmitted as synchronous serial data at a baud rate of 2500 using a 56 kHz carrier frequency. Data consists of 10 bits of horizontal position data, 10 bits of vertical position data, 2 button data bits, 3 control bits, and 6 cyclic redundancy check (CRC).

A six volt source for the microprocessor 86 (PIC 16C62A) is provided, for example, by four 1.5 volt ("AAA") batteries. A step-up voltage converter 151 allows the battery voltage to drop below the voltage $V_A$ of 5 volts supplied to the analog circuitry. The converter 151 employs a switching regulator U10, a Schotky diode D8, and an inductor L1. The analog voltage $V_A$ is switched on and off by the microprocessor 86 via a transistor Q4.

The Left and Right (L switch, R switch) switches 14, 18, 19, correspond to the standard mouse buttons, and their function is defined by the set top box or other receiving device. Typically the Left switch is used to select an icon, or used to "drag and drop" an icon. The Right switch may be used to select other menus or functions.

The Track switch 14 is a dual function switch. In the preferred embodiment, the first portion of the switch is a capacitive proximity detector. The switch cap is composed of 2 concentric but insulated plates. The microprocessor 86 applies a high frequency signal to one plate, with the second plate biased close to the threshold level of an input to the microprocessor 86. When the user places a finger or thumb on the switch cover, the increase in capacitance is detected, and causes the mouse to send x-y position data. When the switch is depressed, a second tactile feedback switch is activated, causing the Left Switch Down signal to be sent.

A constant current driver 153 is provided for the two LED's D4, D5 of the back channel. The current through to the LED's $D_4$ and $D_5$ is limited by the voltage across R13 (3.3Ω) on the base of a transistor Q2. The conventional universal remote output signal is fed to an input transistor $Q_5$ of the LED driver circuit on a signal line 154. The universal remote oscillator signal is fed to the microprocessor 86 on a second signal line 155. When this oscillator is on, the microprocessor 86 sends a code to the beacon 12 to stop sending pulses and terminates operation of the mouse circuit of FIGS. 5, 7–9, and the conventional universal remote signal is transmitted by the LED's $D_4$ $D_5$ to the TV, VCR, etc. When operation of the conventional universal remote control is completed, the mouse circuit of FIG. 5, 7–9 sends another signal to start the beacon 12 and re-establish data communications.

Figure 10:
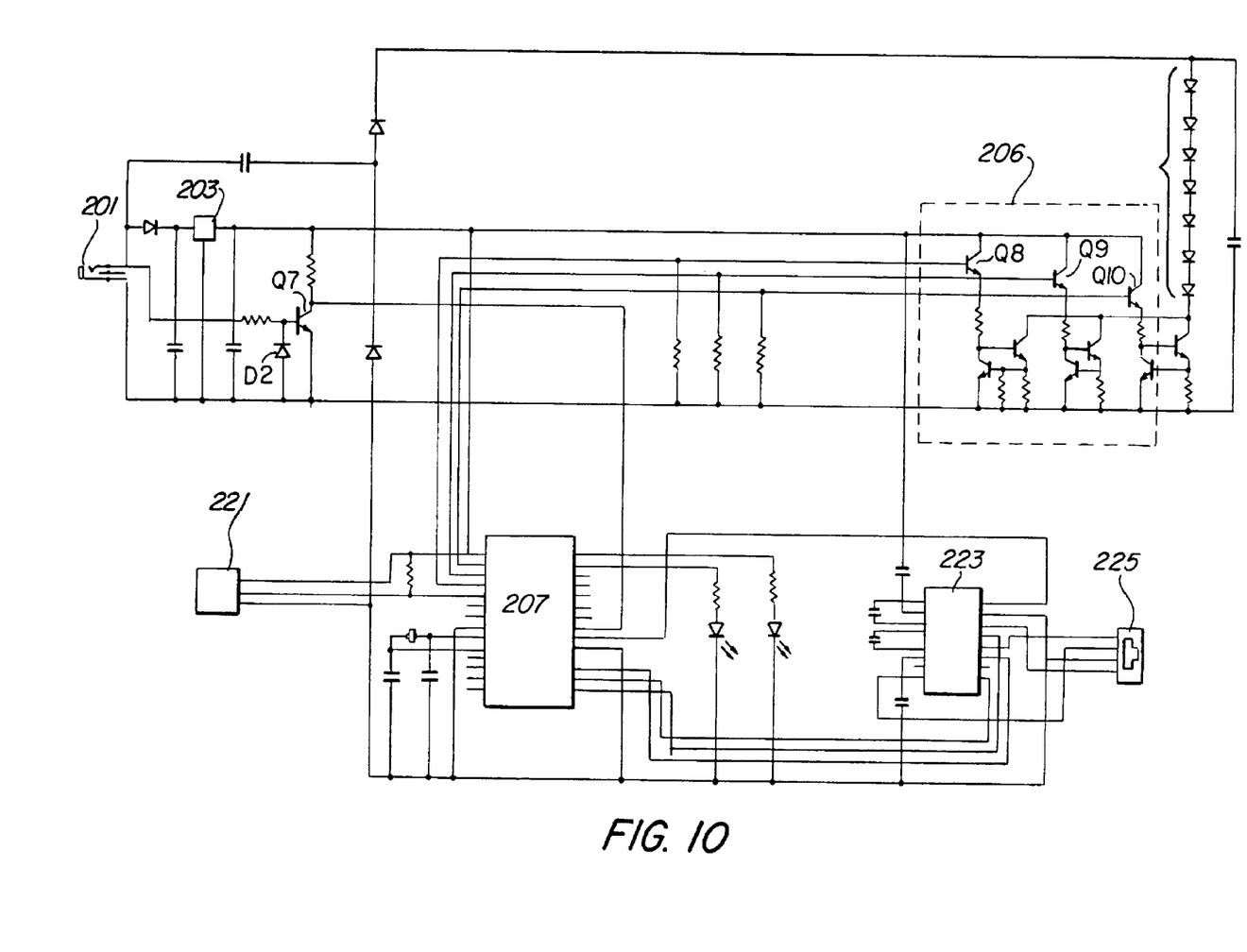
FIG. 10 is an electrical circuit diagram of a beacon receiver/transmitter according to the preferred embodiment.

Circuitry comprising the beacon 12 is shown in FIG. 10. With respect to the transmit side of the beacon 12, a 12 volt AC power source 201 is connected to a voltage doubler circuit, which supplies 24 volts to drive a string of seven series connected LED's 205 (e.g., part no. LTE 5208A). A 5 volt regulator 203 regulates the power supply.

Figure 11:
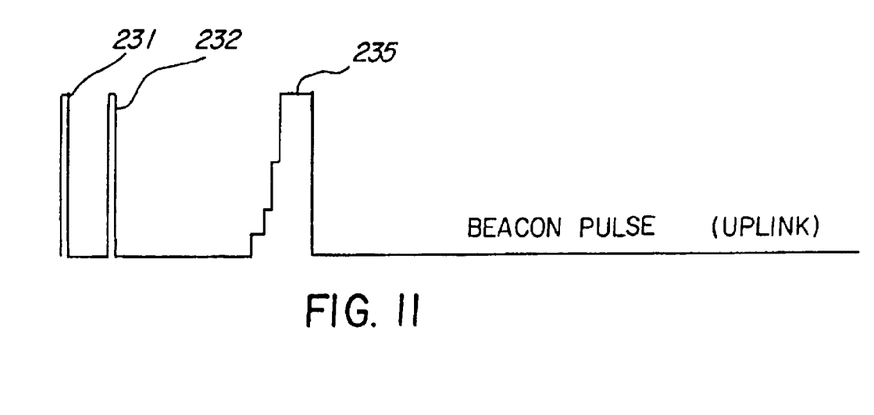
FIG. 11 is a waveform diagram of pulses generated by the circuitry of FIG. 10.

A zero crossing switch provides a squared-up 60 Hz signal to a microprocessor 207. The zero crossing switch comprises a transistor (Q1) having its base connected directly to the AC source 201 and to a clamping diode D2. The 60 Hz trigger signal generated by Q1 is thus synchronous with the 60 Hz line signal, which eliminates flickering interference from other infrared sources, such as light bulbs. The 60 Hz signal is fed to the microprocessor 207, which then sequentially triggers transistors Q8, Q9, Q10 to create a ramped-up output pulse 209 (FIG. 11). As stated earlier the pulse 235 starts out at a level of 1/16 maximum for 24 microseconds, and is then stepped to ¼ maximum for 13.5 microseconds, ½ maximum for 13.5 microseconds, and maximum for an additional 69 microseconds. The pulse 209 constitutes the driver pulse for the LED's 205.

With respect to the receive side of the beacon 12, infrared back channel signals generated by the circuit of FIGS. 4, 7–9 in the format of FIG. 8 are received by an infrared receiver 221, which may be an off-the-shelf component (chip). This receiver 221 converts the received signal to a filtered digital output signal supplied to the microprocessor 207. The microprocessor 207 is in turn connected to transmit and receive data from a standard RS232 interface chip 223 via respective signal lines. The interface chip 223 in turn communicates in standard fashion with an RS232 port 225.

In operation of the circuit of FIG. 7, the beacon 12 outputs two short pulses 231, 232 followed by an integrate (stepped pulse) 235 (FIG. 11). The sensor circuitry of FIGS. 5, 7–9 looks for the first short pulse 231, confirms that there is another one 232, one hundred microseconds later, and in response opens the window of operation of the circuitry of FIGS. 5, 7–9 in time to receive the integrate pulse 235. As noted, this pulse 235 is formed by the transistor driver circuitry 206 adjacent the LED's 205.

X and Y data is then determined by the circuitry of FIGS. 5, 7–9 and transmitted back to the beacon IR receiver chip 221 via infrared LED's $D_4$ and $D_5$ of FIG. 9. As noted, the data format is 10 bits of X data, 10 bits of Y data, 3 control bits, Left button, Right button and a 6 bit cyclic redundancy check. The beacon 12 receives circuitry then converts this data to RS232 serial data, which is then processed by the set top box or TV.

The presently preferred embodiment uses seven infrared light diodes 205 to increase the 50% power angle from 20 degrees to 120 degrees. Six of the infrared light diodes are positioned at 20 degrees off-axis. The seventh diode has a wide angle output and is used to increase the vertical coverage at close range. In an alternative embodiment, additional diodes may be added to increase the 50% power angle.

The program flow of the TV mouse remote unit firmware proceeds as follows:

1) Check Universal Remote

The program checks to see if the universal remote is in use. If the universal remote is in use and the beacon is on, a flag is set. If the beacon was previously turned off for the universal remote, the program will wait until the universal remote is no longer in use, and then send the signal to turn the beacon back on. The program continues with 2) Wait for Trigger.

2) Wait for Trigger

The unit waits for a double pulse from the beacon on the trigger input line. When the double pulse is detected, the program starts a light integration timer and a data transmission timer. Program execution then continues with 3) Integrate. The wait loop also keeps track of the time since the last user activation of the remote unit. After a specified duration with no user input, the program jumps to 9) Sleep.

3) Integrate

When the light integration timer set in 2) overflows, the integrate circuitry is turned on to integrate the light pulse from the beacon. A timer is also started to specify the maximum integration time. Integration ends when either a) the integral of the reference signal reaches a preset maximum value, or b) the maximum integration time is reached. IF the maximum integration time is reached before the reference integral reaches its maximum value, the reference integral is check to see if it has reached a preset minimum value. If the reference integral has not reached the minimum value, this condition is noted with a flag and execution jumps to 8) Format Data. Otherwise, the program continues with 4) Downramp.

4) Downramp

The downramp routine turns on the downramp circuitry and starts a timer to specify the end of the downramp. Counters are also started to measure the time for the x and y inputs to reach zero. When an input (x or y) reaches zero the appropriate counter is stopped. If an input (x or y) has not reached zero by the time the downramp timer overflows, the appropriate counter is assigned the maximum value. The wide angle integrator input is checked at the end of the downramp time to see if it has reached zero. If the wide angle integrator input has not reached zero then this condition is noted with a flag and execution jumps to 7) Otherwise, the program continues with 5) Calculate.

5) Calculate

The calculate routine takes the values from the counters in 4) Downramp and uses them to calculate the corresponding x and y values. After calculating x and y, the program continues with 6) Track 6) Track The Track routine checks the track switch activation. If the Track switch is not active, x and y values are set to zero to conserve power. The program continues with 7) Switch.

7) Switch

The switch routine determines if the user is pressing the Left and Right mouse switch, and sets a flag to indicate the state of the switch. The program then continues with 8) Format Data.

8) Format Data

The format data routine puts the x data, y data, button data and condition flag data into the appropriate format for transmission to the beacon. If the universal remote flag was set in 1), the data includes a flag to turn the beacon off. For certain error conditions, the x and y data are set to zero to conserve power in the transmitted signal. A checksum for the data is also calculated. The program then continues with 9) Send Data.

9) Send Data

The send data routine generates the carrier frequency and transmits the formatted data to the beacon. Data transmission is started when the data transmission timer in 2) overflows. After the data has been transmitted, the program returns to 1).

10) Sleep

The sleep routine puts the unit into partial shutdown to conserve power. The unit will "wake up" when the user presses any of the buttons on the unit. Upon waking up the unit will reinitialize itself and then go to 1).

The program flow of the TV mouse beacon proceeds as follows:

1) Wait for Trigger

The program looks for a signal on the DTR line. If the DTR signal is a pulse of a predetermined length, the program jumps to 3) Data Transmit and sends data from the ASCII characters "T", "V", "M", and "I". If DTR is on continuously, the program waits for a trigger from the zero crossing detector Q1 which is synchronous with line frequency (60 Hz). When the trigger is received, the program sets a data receive timer and then continues with 2) IR Pulse. IF there is not DTR signal, the trigger is disabled and the program waits for a DTR signal.

2) IR Pulse

The beacon sends a double IR pulse (trigger pulse), followed by a longer IR pulse (integrate pulse). If there is new, valid data from the remote unit, the data is formatted for transmission to the computer. The program then continues with 3) Data Transmit.

3) Data Transmit

If the beacon has received new, valid data from the remote unit on the previous field, it sends the data in a serial transmission to the computer. Invalid or repeated data is not sent. The program then continues with 4) Data Receive 4) Data Receive When the data receive timer from 1) overflows, the program reads the incoming serial data from the remote unit. The program continues with 5) CRC Check.

5) CRC Check

The CRC Check routine takes the data received from the remote unit and performs an error check. If there are no errors the data is marked as valid. The program continues with 6) New Check /Filter.

6) New Check/Filter

The program compares the current x, y and button data received from the remote unit with the previous data. If the data are different, when the current and previous positions vary by 3 or less, the output is the average of the current position and the previous 3 positions. When the current and previous position vary by 4 or 5 counts, the output is the average of 2 current positions and the previous 2 positions. When the current and previous positions vary by 6 or 7 counts the output is the average of 3 current positions and the previous position. If the current position varies by 8 or more from the previous position, it is output without modification. The data is then marked as new to be sent to the computer at the next Data Transmit (3). The program continues with 8) Beacon Off Check 7) Beacon Off Check The data from the remote unit is check for a "beacon off" flag. If the flag is present then the program continues with 8) Beacon On. If the flag is not present then the program jumps to 1) Wait for Trigger.

8) Beacon On

If the beacon has been turned off by the remote unit, then it waits for a "beacon on" signal from the remote unit before resuming execution.

Those skilled in the art will appreciate that various adaptations and modifications of the just-described preferred embodiments can be configured without departing from the scope and spirit of the invention. Therefore, it is to be understood that within the scope of the appended claims, the invention may be practiced other than as specifically described herein.

What is claimed is:

1. An apparatus for monitoring an orientation of a positioning controller relative to an external infrared light source, comprising:

a first photodiode for receiving a first portion of infrared light from the external infrared light source, wherein the first photodiode has a portion thereof masked to limit detection of light beyond a certain angle of orientation of the positioning controller measured from a perpendicular axis;

a second photodiode for receiving a second portion of infrared light from the external infrared light source, wherein the upper half of the second photodiode is masked to limit reception of light on a first side of a first plane bisecting the second photodiode, and to promote reception of light on a second side of the first plane;

a third photodiode for receiving a third portion of infrared light from the external infrared source, wherein the third photodiode has a portion thereof masked to limit reception of light on a first side of a second plane bisecting the third photodiode, and to promote reception of light on a second side of the second plane;

a wide angle sensor having an output which is lower than the first photodiode output within a selected range of angles and higher than the-first photodiode output outside said range; and circuitry for determining an orientation of the positioning controller, specifically, the pitch and yaw of the controller, using the first, second and third portions of received infrared light and the wide angle sensor output and for thereby determining the orientation of the positioning controller relative to the external infrared light source.

2. The apparatus of claim 1 wherein the left half of the third photodiode is masked so that reception of light into the third diode is limited when the third photodiode is pointed to the right of the infrared light source and the reception of light into the third photodiode is promoted when the third photodiode is pointed to the left of the infrared light source.

3. The apparatus of claim 1 wherein the right half of the third photodiode is masked so that reception of light into the third photodiode is limited when the third photodiode is pointed to the left of the infrared light source and the reception of light into the third photodiode is promoted when the third photodiode is pointed to the right of the infrared light source.

4. The apparatus of claim 1 wherein the upper half of the second photodiode is masked so that reception of light into the second photodiode is limited when the second photodiode is pointed below the infrared light source and the reception of light into the second photodiode is promoted when the second photodiode is promoted when the second photodiode is pointed above the infrared light source.

5. A positioning controller having a receiving side for receiving light from an infrared light source, the receiving side including an axis extending perpendicularly therefrom, and a vertical plane and a horizontal plane intersecting at the axis, the positioning controller comprising:

a reference sensor for receiving light from the source, the reference sensor being masked to receive light within a predetermined range of acute angles measured from the axis;

a vertical angle sensor for receiving light from the source, wherein a portion of the vertical sensor is masked to limit reception of light on a first side of a first plane bisecting the vertical angle sensor and to promote reception of light on a second side of the first plane;

a horizontal angle sensor for receiving light from the source, the horizontal angle sensor being masked to receive a larger quantity of light from a first side of the vertical plane than from a second side of the vertical plane;

a wide angle sensor for receiving light from the source and having a wider acceptance angle than that of the reference sensor;

circuitry for detecting an off axis error condition using amounts of light received by the reference sensor and the wide angle sensor;

circuitry for determining an orientation of the positioning controller relative to the light source, specifically, the pitch and yaw of the controller, using amounts of light received by the reference sensor, the vertical angle sensor, the horizontal angle sensor and the wide angle sensor.

6. The apparatus of claim 5 wherein the right half of the horizontal angle sensor is limited when the horizontal angle sensor is pointed to the left of the light source and the reception of light into the horizontal angle sensor is limited when the horizontal angle sensor is pointed to the left of the light source and the reception of light into the horizontal angle sensor is promoted when the horizontal angle sensor is pointed to the right of the light source.

7. The controller of claim 5 wherein the light source is polarized and the controller further comprises a roll sensor for receiving polarized light from the light source, the roll sensor being filtered to receive a maximum amount of light when the apparatus is in a predetermined orientation relative to the infrared light source.

8. The apparatus of claim 5 wherein the vertical angle sensor is masked such that reception of light into the vertical sensor is limited when the vertical angle sensor is pointed above the light source and the reception of light into the vertical angle sensor is promoted when the vertical angle sensor is pointed below the light source.

9. An apparatus for monitoring an orientation of a positioning controller relative to an external infrared light source, comprising:

a first photodiode for receiving a first portion of infrared light from the external infrared light source, the first photodiode masked to limit detection of light beyond a certain angle of orientation of the pointing device measured from a perpendicular axis;

a second photodiode for receiving a second portion of infrared light from the external infrared light source, wherein a portion of the second photodiode is masked to limit reception of light on a first side of a first plane bisecting the second photodiode, and to promote reception of light on a second side of the first plane;

a third photodiode for receiving a third portion of infrared light from the infrared light source, the third photodiode having a portion masked to limit reception of light on a first side of a second plane bisecting the photodiode, and to promote reception of light on second side of the second plane;

a wide angle sensor for receiving a fourth portion of infrared light from the infrared light source and having a wider acceptance angle that that of the reference sensor;

circuitry for detecting an off axis error condition using amounts of light received by the reference sensor and the wide angle sensor;

circuitry for determining an orientation of the positioning controller using the first, second, third and fourth portions of received infrared light and for thereby determining the orientation of the positioning controller relative to the external infrared light source.

10. The apparatus of claim 9 wherein the left half of the third photodiode is masked so that reception of light into the third photodiode is limited when the third photodiode is pointed to the right of the infrared light source and the reception of light into the third photodiode is promoted when the third photodiode is pointed to the left of the infrared light source.

11. The apparatus of claim 9 wherein the infrared light source is polarized and the apparatus further comprises a fourth photodiode masked by a polarizing filter, the filter being oriented to receive a maximum amount of light when the apparatus is in a predetermined orientation relative to the infrared light source, such that a roll axis of the apparatus can be determined by the circuitry.

12. The apparatus of claim 9 wherein an upper half of the second photodiode is masked so that reception of light into the second photodiode is limited when the second photodiode is pointed above the infrared light source and the reception of light into the second photodiode is promoted when the second photodiode is pointed below the infrared light source.

13. A method of obtaining a large range of operable distances between a positioning controller and a display, the positioning controller including a first reference sensor, a second wider angle reference sensor and an angle-detecting sensor, the method comprising the following steps:

transmitting infrared light from a beacon located near the display;

receiving the transmitted light into the reference sensors and the angle-detecting sensor, each of the reference sensors and the angle-detecting sensor generating an output proportional to the amount of light received therein;

integrating the output of the reference sensors for a predetermined amount of time, each of the two integrals representing respective accumulation of output over the predetermined amount of time; and comparing the outputs of the first and second reference sensors to determine operation outside of a permissible range of operating angles.

14. The method of claim 13 further comprising:

a) making a first determination of whether a predetermined maximum amount of light has been received into the reference sensor, the first determination being made by comparing the accumulation of the reference sensor output with a predetermined threshold;

1) discontinuing integration of the outputs of the reference sensor and the angle-detecting sensor, if the predetermined maximum amount of light has been received; and 2) continuing to integrate the outputs of the reference sensor and the angle-detecting sensor, if the predetermined maximum amount of light has not been received; and b) making a second determination of whether a predetermined amount of time has passed from a time that the integrations began, if the predetermined maximum amount of light has not been received:

1) discontinuing integration of the outputs of the reference sensor and the angle-detecting sensor, if the predetermined maximum amount of time has passed; and 2) continuing to integrate the outputs of the reference sensor and the angle-detecting sensor, if the predetermined maximum amount of time has not passed;

comparing the two accumulations; and determining an orientation of the positioning controller based on the comparison.

15. A method of increasing the dynamic range of an infrared sensor device employing vertical, horizontal and reference sensors comprising the steps of:

increasing the effective area of each of said vertical, horizontal and reference sensors by employing respective lens elements to increase their effective area wherein at least one sensor includes optics;

employing a second reference sensor to detect data which is unreliable due to reflections within the sensor optics;

providing a transmitted pulse of increased magnitude; and shaping said pulse to a pulse starting at a low level and proceeding to higher levels.

16. A method for use in increasing the range of an infrared pointing device employing a vertical sensor, horizontal sensor and a first reference sensor, comprising the steps of:

providing a second reference sensor having a wider acceptance angle than that of said first reference sensor; and comparing the output of the first reference sensor to the output of the second reference sensor.

17. The method of claim 16 wherein detected angle data is determined to be unreliable if the output of said first reference sensor and said second reference sensor determine that an off axis error location is present.

18. An apparatus for controlling electronic devices using infrared coded signals specific to each electronic device comprising:
- memory to store a number of device specific codes;
- a control circuit to convert user inputs into a plurality of said device specific codes;
- output circuitry to convert a selected device specific code into corresponding infrared signal; and
- circuitry to monitor an orientation of a positioning controller relative to an external infrared light source includes,
  - a first photodiode for receiving a first portion of infrared light from the external infrared light source, wherein the first photodiode has a portion thereof masked to limit detection of light beyond a certain angle of orientation of the positioning controller measured from a perpendicular axis;
  - a second photodiode for receiving a second portion of infrared light from the external infrared light source, wherein a portion of the second photodiode is masked to limit reception of light on a first side of a first plane bisecting the second photodiode, and to promote reception of light on a second side of the first plane;
  - a third photodiode for receiving a third portion of infrared light from the external infrared source, wherein the third photodiode has a portion thereof masked to limit reception of light on a first side of a second plane bisecting the third photodiode, and to promote reception of light on a second side of the second plane; and circuitry for determining an orientation of the positioning controller, specifically, the pitch and yaw of the controller, using the first, second and third portions of received infrared light and for thereby determining the orientation of the positioning controller relative to the external infrared light source.

19. The apparatus of claim 18 wherein the circuitry to monitor an orientation of a positioning controller relative to an external infrared light source consists of:
- the first photodiode for receiving a first portion of infrared light from the external infrared light source, wherein the first photodiode has a portion thereof masked to limit detection of light beyond a certain angle of orientation of the positioning controller measured from a perpendicular axis;
- the second photodiode for receiving a second portion of infrared light from the external infrared light source, wherein a portion of the second photodiode is masked to limit reception of light on a first side of a first plane bisecting the second photodiode, and to promote reception of light on a second side of the first plane;
- the third photodiode for receiving a third portion of infrared light from the external infrared source, wherein the third photodiode has a portion thereof masked to limit reception of light on a first side of a second plane bisecting the third photodiode, and to promote reception of light on a second side of the second plane;
- a wide angle sensor for receiving a fourth portion of infrared light from the infrared light source and having a wider acceptance angle than that of the reference sensor;
- circuitry for detecting an off axis error condition using amounts of light received by the reference sensor and the wide angle sensor;
- circuitry for determining an orientation of the positioning controller, specifically, the pitch and yaw of the controller, using the first, second, third and fourth portions of received infrared light and for thereby determining the orientation of the positioning controller relative to the external infrared light source.

20. The apparatus of claim 19 wherein the apparatus controls the external infrared light source so that said external infrared light source is not producing infrared energy when the apparatus is transmitting infrared coded signals specific to each electronic device.

21. The apparatus of claim 20 wherein said positioning controller device is adapted to cooperate in emulating functions of a computer mouse.

22. An apparatus for monitoring an orientation of a positioning controller relative to an external infrared light source, comprising: a reference sensor for receiving light from the source, the reference sensor being masked to receive light within a predetermined range of acute angles measured from a perpendicular axis;
- a vertical angle sensor for receiving light from the source, wherein a portion of the vertical sensor is masked to limit reception of light on a first side of a first plane bisecting the vertical angle sensor and to promote reception of light on a second side of the first plane;
- a horizontal angle sensor for receiving light from the source, the horizontal angle sensor being masked to receive a larger quantity of light from a first side of the vertical plane than from a second side of the vertical plane;
- a wide angle sensor having a relative output which when lower than the reference sensor output within a selected range of angles is higher than the reference sensor output outside said range; and
- circuitry for determining an orientation of the positioning controller relative to the light source, specifically, the pitch and yaw of the controller, using amounts of light received by the reference sensor, the vertical angle sensor, the horizontal angle sensor and the wide angle sensor.

23. A method of increasing the dynamic range of an infrared sensor device employing vertical, horizontal and reference sensors with optical elements comprising the steps of:
- employing a second reference sensor to detect data which is unreliable due to reflections within the sensor optical elements;
- providing a transmitted pulse of increased magnitude; and
- shaping said pulse to a pulse starting at a low level and proceeding to higher levels.

* * * * *